Patented Feb. 22, 1944

2,342,135

UNITED STATES PATENT OFFICE 2,342,135

ARYLAMINO DIHYDROBENZOFURANE

Carlin F. Gibbs, Cuyahoga Falls, Ohio, assignor to The B. F. Goodrich Company, New York, N. Y., a corporation of New York No Drawing. Application August 7, 1941, Serial No. 405,792

7 Claims. (Cl. 260—346)

This invention relates to new compositions of matter of the class comprising the 2-methyl-2-alkyl arylamino dihydrobenzofuranes.

These compounds are useful as antioxidants. They may be employed in small amounts, ranging from 0.1% to 5% or more, in rubber compositions to prevent or retard their deterioration when exposed to light or air. Among the rubbers which may be treated in this manner are all the natural rubbers, such as caoutchouc, balata, gutta percha, latex, as well as artificial rubber isomers, and certain synthetic rubber-like materials such as copolymers of butadiene with other copolymerizable monomers. My new compounds may also be used to preserve oils which are easily oxidized, such as fish oils, linseed oil, tung oil, and other natural oils, gasoline containing unsaturates, etc.

My new class of compounds comprises those having the structure

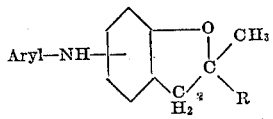

in which R is hydrogen or an alkyl group; among these compounds are 2,2-dimethyl-5-anilino dihydrobenzofurane
2,2-dimethyl-5-xenylamino dihydrobenzofurane
2,2-dimethyl-5-beta-naphthylamino dihydrobenzofurane
2,2-dimethyl-4-anilino dihydrobenzofurane
2,2-dimethyl-6-anilino dihydrobenzofurane
2,2-dimethyl-7-anilino dihydrobenzofurane
2-methyl 2-hexyl-5-anilino dihydrobenzofurane
2-methyl 2-butyl-6-xenylamino dihydrobenzofurane
2-methyl 2-hexyl-5-beta-naphthylamino dihydrobenzofurane, and the like.

As a specific example of my invention, I will describe the preparation of 2,2-dimethyl 5-anilino dihydrobenzofurane. The most convenient starting materials for the synthesis are p-hydroxy diphenylamine and beta-methallyl chloride which may be reacted in the proportion of one mole of beta-methallyl chloride to one mole of p-hydroxy diphenylamine in the presence of about 1.5 moles of 10% alcoholic potash solution. The reaction mixture, after refluxing for one or two hours is neutralized, cooled, and a good yield of p-beta-methallyloxy diphenylamine filtered off.

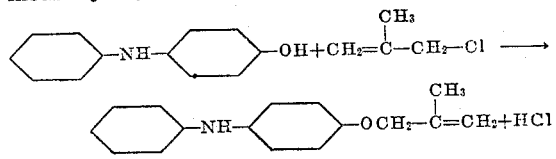

The methallyloxy diphenylamine is then rearranged by dissolving it in about half its weight of diethyl aniline as solvent and heating to about 200° C. for thirty to forty minutes. Dimethyl aniline, or hydrocarbon solvents may also be used. The product, 3-beta-methallyl 4-hydroxy diphenylamine, may be conveniently separated from the solvent by fractional distillation at reduced pressure. The product boils at 165° to 175° C. at 3 mm. pressure.

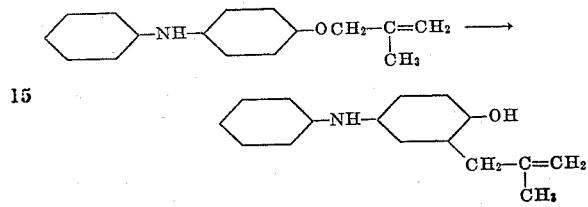

Cyclization of the alkenyl hydroxy diphenylamine is accomplished by heating it with two molecular equivalents of pyridine hydrochloride at about 225° to 250° C. for ten to twenty minutes. The product may be separated from the reaction mixture by washing with water followed by washing with 10% caustic solution, extraction with benzene, and distilling the extract to separate the lower boiling benzene from the product.

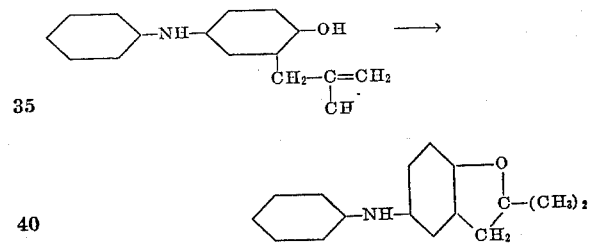

The material boils at 145° to 150° C. at 3 mm. pressure and melts at 64° to 66° C.

A similar series of reactions may be used for other similar compounds, using as starting materials the appropriate arylamino phenol and a beta-alkyl allyl chloride. The beta-alkyl group keeps its position in the hydrocarbon chain through both the rearrangement of the ether and the cyclization reactions. The position of the arylamino group in the benzene ring has little effect on the reaction, although the position para to the hydroxy group appears to favor the reaction more than the other positions. A substituted allyl bromide may be used as one of the starting materials rather than the chloride if desired. Among the substituted allyl halides which may be used as starting materials in the synthesis are beta-methallyl, beta-ethylallyl, beta-propyl allyl, beta-butyl allyl, beta-hexyl allyl, etc., chloride or bromide.

Although I have herein disclosed specific embodiments of my invention, I do not intended to limit myself solely thereto, but only as indicated by the appended claims.

I claim:

1. A compound having the structure

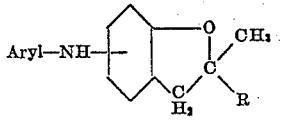

in which R is a member of the class consisting of hydrogen and alkyl groups.

2. A compound having the structure

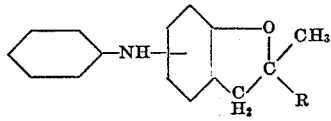

in which R is a member of the class consisting of hydrogen and alkyl groups.

3. A compound having the structure

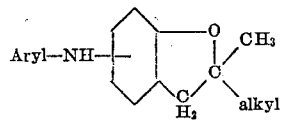

4. A compound having the structure

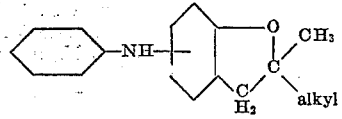

5. 2,2-dimethyl-5-anilino dihydrobenzofurane.

6. An arylamino dihydrobenzofurane in which the arylamino group is directly attached to the benzo group, and having at least one alkyl group attached to the 2-carbon atom of the furane ring.

7. A compound which is a phenylamino dihydrobenzofurane in which the phenylamino group is directly attached to the benzo group, and having at least one alkyl group attached to the 2-carbon atom of the furane ring.

CARLIN F. GIBBS.

CERTIFICATE OF CORRECTION.

Patent No. 2,342,135.  February 22, 1944.

CARLIN F. GIBBS.

It is hereby certified that error appears in the printed specification of the above numbered patent requiring correction as follows: Page 1, second column, line 35, for that portion of the formula reading "CH" read --$CH_3$--; page 2, first column, line 4, for "intended" read --intend--; and that the said Letters Patent should be read with this correction therein that the same may conform to the record of the case in the Patent Office.

Signed and sealed this 23rd day of May, A. D. 1944.

(Seal)

Leslie Frazer
Acting Commissioner of Patents.